April 14, 1936.  W. R. HAMILTON ET AL  2,037,575
ALARM DEVICE FOR SPRINKLER SYSTEMS
Filed Sept. 16, 1932   6 Sheets-Sheet 1

INVENTORS
WILLIAM. R. HAMILTON
ROBERT. W. HAMILTON
BY J.T. O'Connell
ATTORNEY

April 14, 1936.   W. R. HAMILTON ET AL   2,037,575
ALARM DEVICE FOR SPRINKLER SYSTEMS
Filed Sept. 16, 1932   6 Sheets-Sheet 3

INVENTORS
WILLIAM.R.HAMILTON
ROBERT.W.HAMILTON
BY J.T.O'Connell
ATTORNEY

April 14, 1936.  W. R. HAMILTON ET AL  2,037,575
ALARM DEVICE FOR SPRINKLER SYSTEMS
Filed Sept. 16, 1932  6 Sheets-Sheet 4

INVENTORS
WILLIAM.R.HAMILTON
ROBERT.W.HAMILTON
BY J.D.O'Connell
ATTORNEY

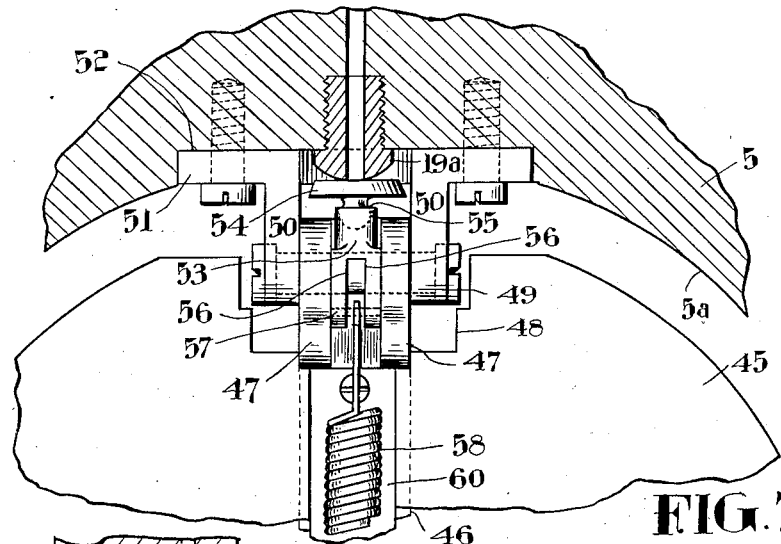
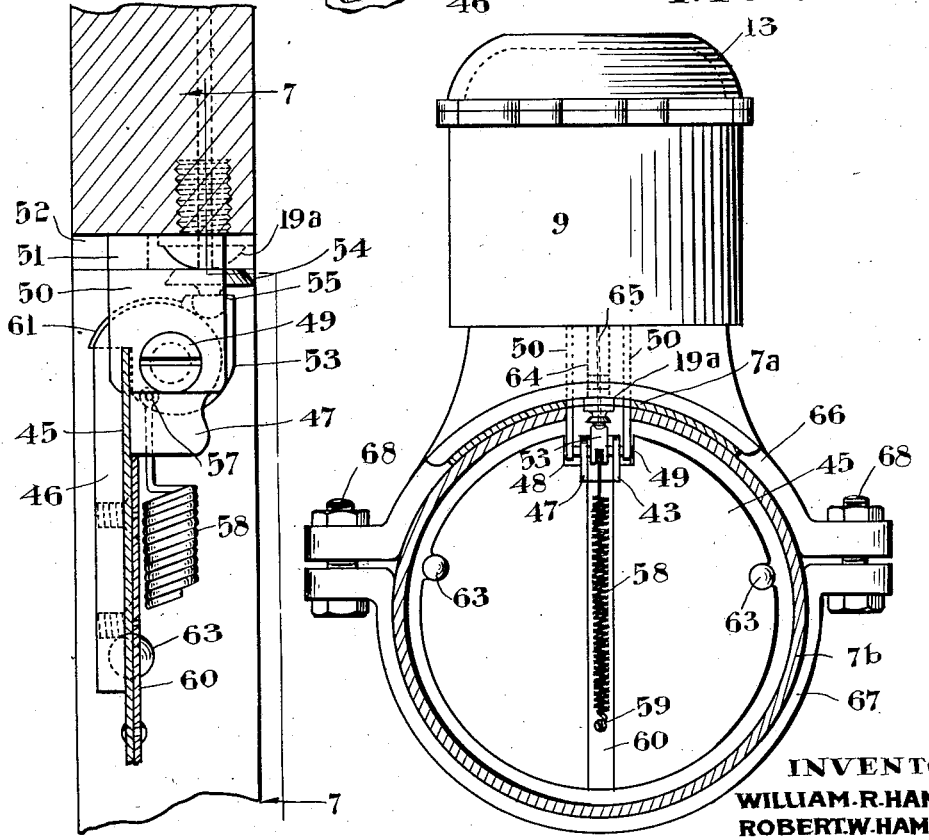

April 14, 1936.  W. R. HAMILTON ET AL  2,037,575
ALARM DEVICE FOR SPRINKLER SYSTEMS
Filed Sept. 16, 1932   6 Sheets-Sheet 6

INVENTORS
WILLIAM. R. HAMILTON
ROBERT. W. HAMILTON
BY J. D. O'Connell
ATTORNEY

Patented Apr. 14, 1936

2,037,575

UNITED STATES PATENT OFFICE 2,037,575

ALARM DEVICE FOR SPRINKLER SYSTEMS

William R. Hamilton and Robert W. Hamilton, Montreal, Quebec, Canada

Application September 16, 1932, Serial No. 633,495

6 Claims. (Cl. 137—152)

This invention relates to a flow operated switch for actuating an electrical alarm device whenever the flow of fluid in a pipe line exceeds a predetermined rate. The invention is expected to prove particularly useful in connection with electrical alarm circuits associated with fire extinguishing sprinkler systems but is also intended to be used for other purposes to which it may be adapted.

One object of the invention is to provide a generally improved flow operated switch assembly having the component parts constructed and assembled in such manner as to materially reduce the cost of manufacture as compared with similar installations now in use.

Another object is to provide a flow operated switch mechanism that will not be materially affected by momentary surges due to sudden changes in the water supply pressure and does not materially obstruct the flow through the pipe line to which it is applied.

A further object is to provide a flow operated switch mechanism which, while having the required sensitivity, will not be damaged by intermittent or continued flow up to the full capacity of the pipe line in either direction.

A further object is to provide a flow operated switch mechanism in the form of a compact self-contained unit capable of being economically and quickly installed in any existing pipe line.

A further object is to provide a flow operated switch mechanism that will operate efficiently over a long period of time without requiring cleaning or replacement of parts.

A still further object is to provide a flow operated switch mechanism designed so that it has inherent fixed sensitivity and is, therefore, not subject to adjustment in the field.

A still further object is to provide a flow operated switch mechanism designed so that the contact pressure remains constant irrespective of the rate of flow.

Proceeding now to a more detailed description of the invention reference will be had to the accompanying drawings, wherein Fig. 1 is a vertical sectional view through the flow operated switch assembly as applied to the existing pipe line of a conventional fire extinguishing sprinkler system. In this view the parts are shown in the position which they occupy when there is no flow through the pipe line.

Fig. 6 is an enlarged fragmentary sectional view taken substantially along the line 6—6 of Fig. 3.

Fig. 7 is a view taken substantially along the line 7—7 of Fig. 6.

Fig. 12 is a view similar to Fig. 3, but showing certain modifications.

Figure 1:
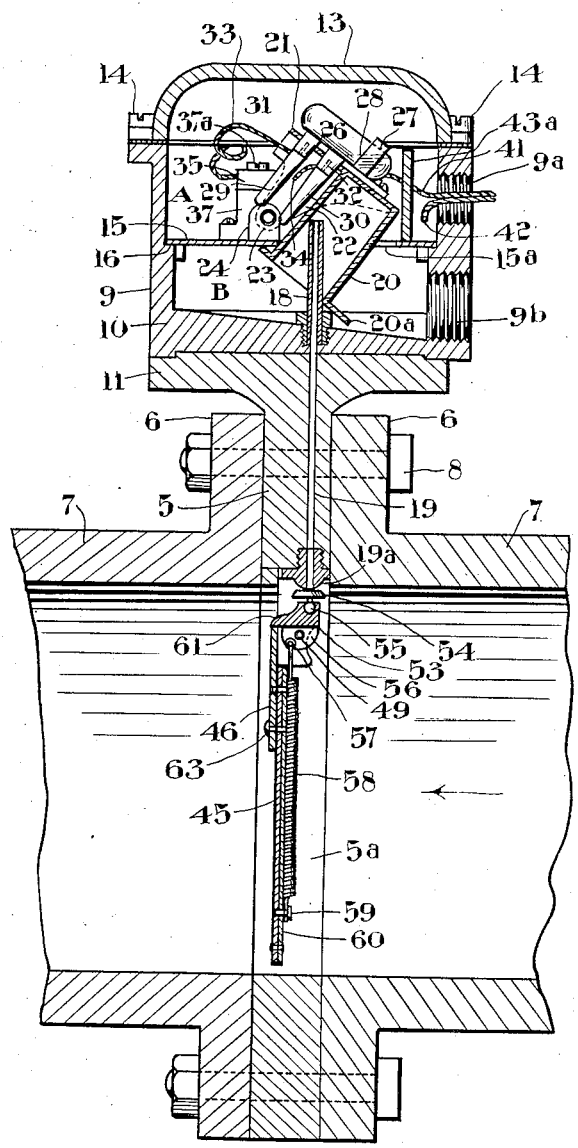
Figure 2:
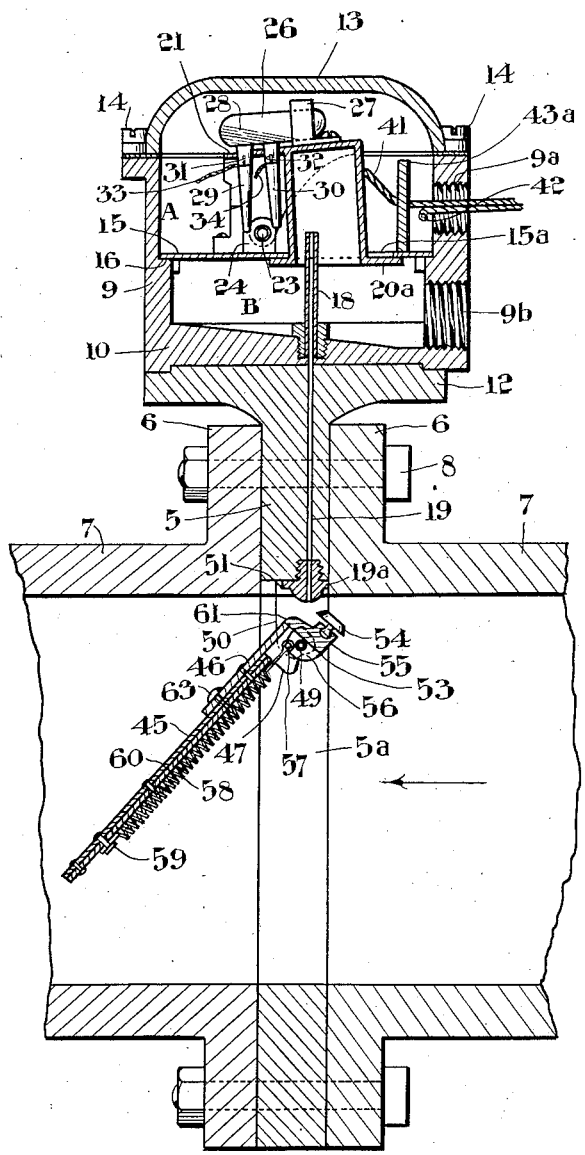
Fig. 2 is a view similar to Fig. 1 but showing the parts in the alarm actuating position to which they are moved when the flow of fluid in the pipe line exceeds a predetermined rate.
Figure 4:
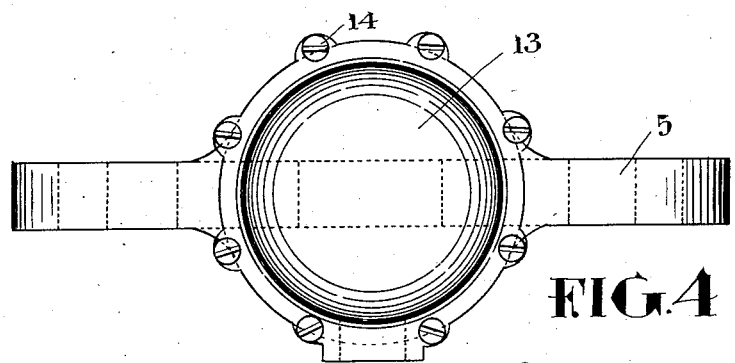
Fig. 4 is a top plan view of the assembly appearing in Fig. 3.
Figure 3:
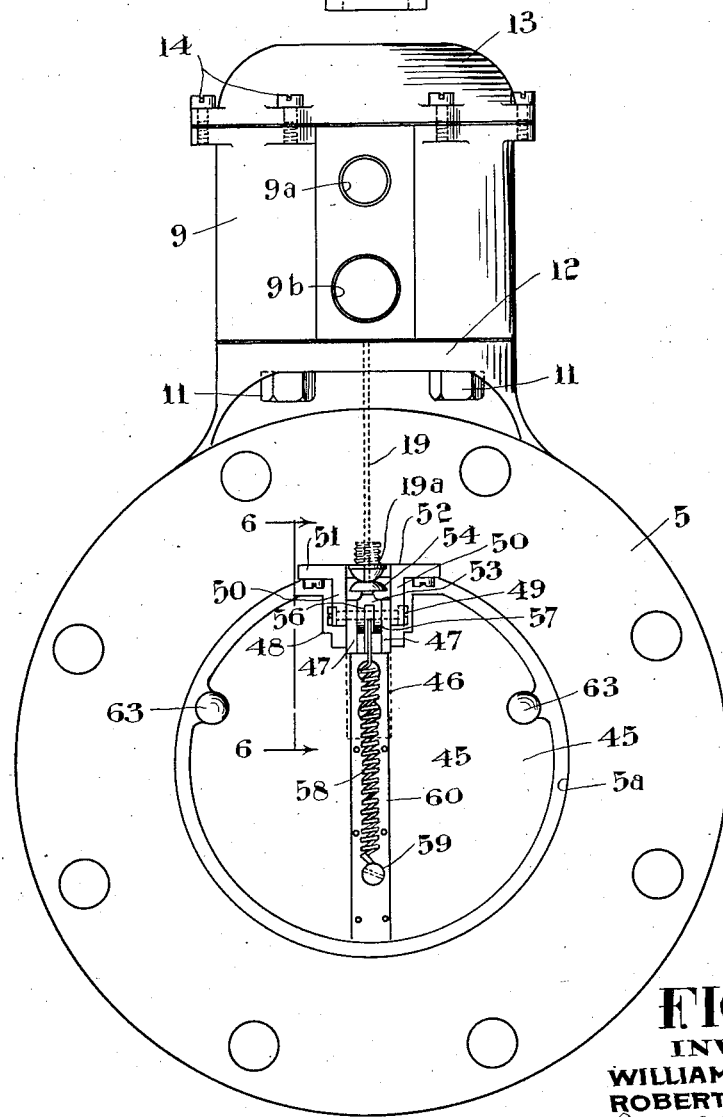
Fig. 3 is a view, in side elevation, of the flow operated switch assembly as it appears detached from the pipe line.
Figure 5:
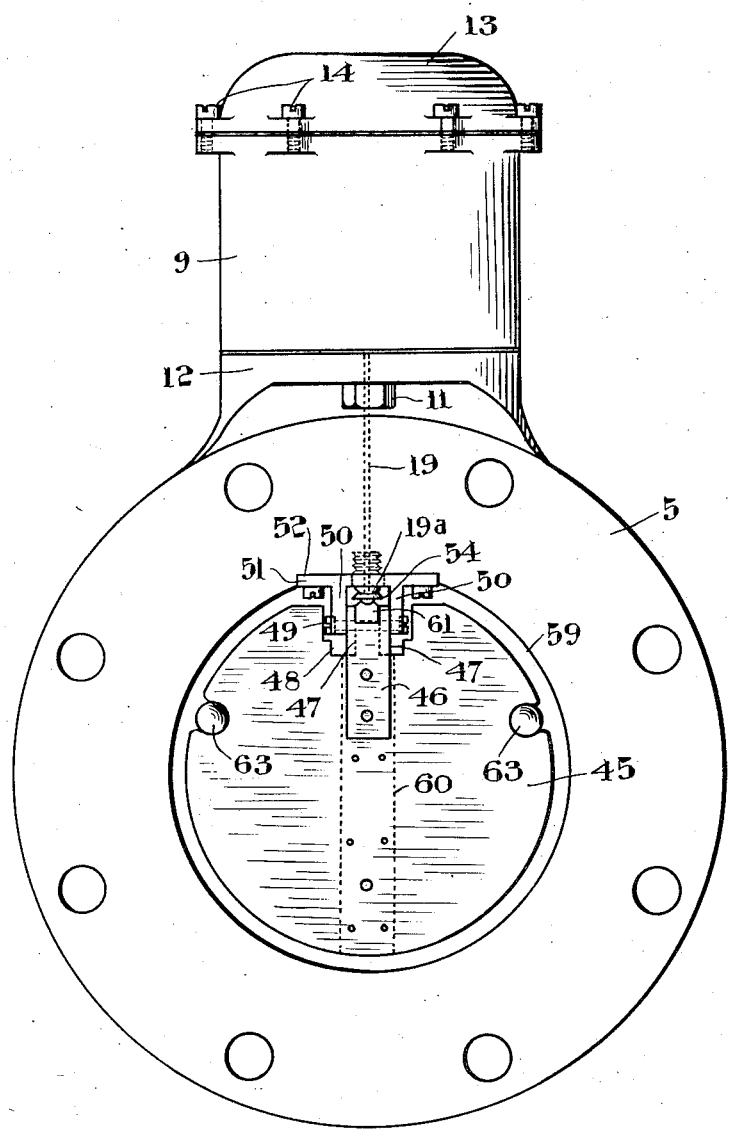
Fig. 5 is a view similar to Fig. 3 but looking towards the opposite side of the assembly.
Figure 8:
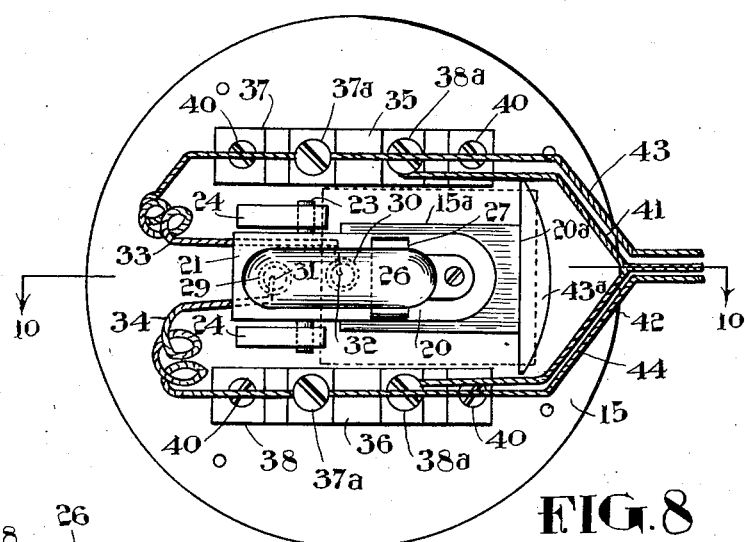
Fig. 8 is a top plan view of a tiltably mounted mercury switch assembly forming part of this invention.
Figures 10, 11:
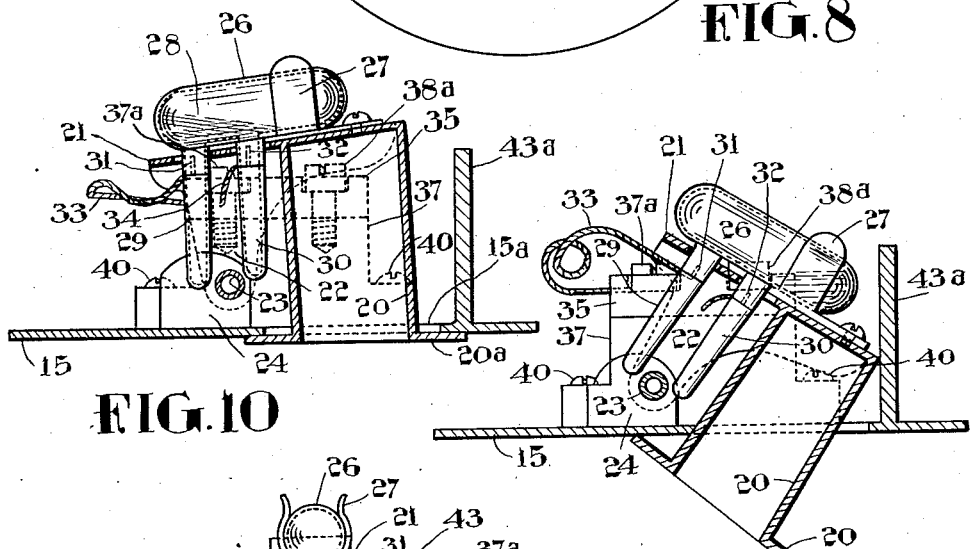
Fig. 10 is a sectional view taken substantially along the line 10—10 of Fig. 8. In this view the mercury container and its electrical attachments appear in side elevation.
Fig. 11 is a view similar to Fig. 10 but showing the parts in a different position.
Figure 9:
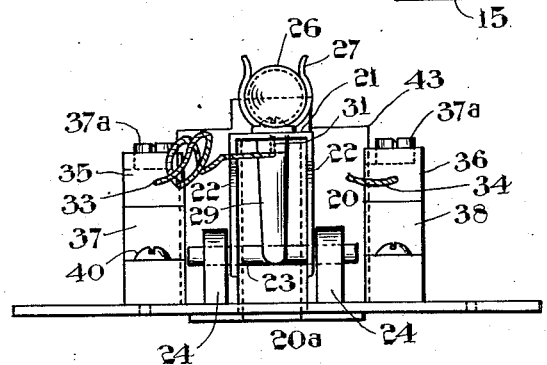
Fig. 9 is a view in elevation looking towards the left of the assembly appearing in Fig. 8.

Referring more particularly to the drawings 5 designates a metal ring adapted to be inserted in the pipe line of a fire sprinkler system, as illustrated in Figs. 1 and 2. As herein shown, said ring is fitted between the flanges 6 of adjacent sections 7 of the pipe line and is held in place by suitable bolts 8. This ring is provided with a central opening 5a, the surrounding wall of which is flush with the inner walls of the pipe sections 7 so that the flow passage through the ring is of the same diameter as that afforded by the pipe sections between which the ring is fitted. Ring 5 is surmounted by a casing 9 having its bottom wall 10 fastened by bolts 11 (see Fig. 3) to a casing supporting base 12 formed integral with the upper portion of the ring. Casing 9 is provided with a covering 13 held in place by bolts 14 and is divided into an upper switch containing compartment A and a lower drainage compartment B by means of a horizontal partition plate 15 resting on a suitable supporting ledge 16. The drain compartment B contains a vertical standpipe 18 which communicates with a vertical bore or jet passage 19 leading from the lower end of the standpipe to the central opening 5a of the supporting ring 5. The upper end of the standpipe 18 projects into an inverted cup 20 forming part of a tiltably mounted mercury switch assembly mounted on the plate 15, the details of said assembly being clearly illustrated in Figs. 8 to 11 inclusive. As herein shown, the cup 20 forms one end of a lever 21 equipped with depending side arms 22 mounted on a pivot 23 which is carried in bearings 24 arranged on the plate 15. Said plate 15 is provided with an opening 15*a* in which the cup 20 is movable and the lower end of said cup is equipped with an outwardly directed flange 20*a*. When the cup is in the position shown in Fig. 2, this flange engages the lower side of the plate 15 and serves to close the space between the cup and the marginal portions of the opening 15*a*. A tubular receptacle 26 is fastened to the upper side of the lever 21 by means of a clip 27. This receptacle contains a quantity of mercury 28 or other conducting fluid and is equipped with a pair of depending electrode containing extensions 29 and 30 in which suitable electrodes 31 and 32 are sealed in accordance with well known practice. These electrodes are connected by leads 33 and 34 (see Figs. 8 and 9) to a pair of metal terminal plates 35 and 36 suitably mounted on insulating blocks 37 and 38 arranged at opposite sides of the lever 21, said insulating blocks being fastened to the upper side of the partition plate 15 by suitable screws 40. The contact plates 35 and 36 are provided with terminal screws 37*a* and 38*a* adapted to be utilized as binding posts for connecting these plates to the leads 41, 42, 43 and 44 of a suitable alarm circuit (not shown), said leads being carried into the upper compartment of the casing 9 through a suitable opening 9*a* and being carried around a guard plate 43*a* which prevents possibility of the leads fouling the cup 20 and interfering with the operation of the lever 21. The lower compartment B of casing 9 is provided with an opening 9*b* preferably formed directly below the opening 9*a*. This opening 9*b* is adapted to be connected with a drain pipe for draining away the water supply to the compartment B as hereinafter explained.

The ring 5 is equipped with a swinging vane 45, the mounting of which is clearly shown in Figs. 3, 4, 6 and 7. As herein shown, a plate 46 is attached to one side of the vane 45 and is provided with spaced lugs 47. These lugs project beyond the opposite sides of the vane through a suitable slot 48 and are mounted to swing about a pivot 49. Pivot 49 is carried by a pair of lugs 50 depending from a plate 51 fastened in a recess 52 formed in the upper wall portion of the ring opening 5*a*. A valve body 53 is loosely mounted on the central portion of the pivot 49 and is equipped with a valve disk 54. This valve disk is preferably secured to the body 53 by a ball and socket joint 55, as shown to advantage in Figs. 1 and 7, and is adapted to co-operate as hereinafter explained with a valve seat 19*a* positioned at the lower end of the previously mentioned jet passage 19. The valve body 53 is provided with a slot 56 and a pin 57, the latter being attached to the upper end of a spring 58 having its lower end attached to a lug 59 projecting from a narrow reinforcing plate 60 applied to one side of the vane 45. Valve body 53 is also provided, as clearly shown in Figs. 1, 2, 4 and 6, with an extension 61 engaging the upper end of the plate 46 so as to cause the valve body to move with the vane 45 when the latter is swung to the inclined position shown in Fig. 2.

In the operation of this invention the parts are normally arranged in the position shown in Fig. 1, wherein it will be noted that the vane 45 hangs vertically from its supporting pivot 49. It will also be noted that, in the position shown in Fig. 1, the lever 21 and the mercury receptacle 26 of the mercury switch are tilted downwardly towards the right so that the cup 20 is in its lowermost position and the electrodes 31 and 32 are isolated from one another by reason of the fact that the mercury or other conducting fluid 28 is contained in the lower right hand end of the receptacle 26 and does not, therefore, bridge the gap between these electrodes. In this position of the vane the valve disk 54 is held to its seat 19*a* by the hydrostatic head of the fluid in the pipe line and by the tension of the spring 58. When there is a positive flow of water in the pipe line, as occurs in case of fire, the direction of flow is that represented by the arrows in Figs. 1 and 2. This flow produces a slight pressure differential between the two sides of the vane 45 which, acting over the entire surface of the vane, tends to deflect the vane in the direction of flow. When the rate of flow reaches a certain predetermined value the force acting on the vane 45 becomes sufficient to overcome the forces tending to hold the valve disk 54 engaged with its seat 19*a*. Vane 45 then swings in the direction of flow as indicated in Fig. 2 and the valve disk 54 is moved to open position away from the seat 19*a* by reason of the engagement obtaining between the upper end of the plate 46 and the extension 61 of the valve body. The valve disk 54 remains in its open position as long as the rate of flow is maintained. When the flow ceases the force of gravity acting on the vane 45 causes the vane to resume its normal vertical position whereby the valve disk 54 is again engaged with its seat 19*a* whereupon the hydrostatic head of the fluid in the pipe line again becomes effective to hold the valve disk tightly to its seat. During the open period of the valve a jet of fluid at high velocity is projected from the pipe line through the jet passage 19 and impinges on the bottom of the inverted cup 20 so that the lever 21 and the receptacle 26 of the mercury switch assembly are tilted to the position shown in Fig. 2. In this position the mercury flows to the left or lower end of the receptacle 26 and bridges the gap between the electrodes 31 and 32 in order to actuate the alarm circuit represented by the leads 41 and 42. In the case of imperfect seating of the valve disk 54, the small quantity of fluid permitted to flow upwardly in the jet passage 19 does not have sufficient velocity to actuate the cup 20, but merely overflows the upper end of the standpipe 18 and falls into the drain compartment B from whence it is discharged through the drain opening 9*b*.

When there is a change in the supply pressure of the fluid in the sprinkler system this produces a momentary surging of the water in the pipe line for which no alarm indication is desirable. This is taken care of in the present invention by controlling the sensitivity of the valve disk 54 so that this disk will uncover the lower end of the jet pipe 19*a* in sufficient degree to actuate the alarm switch only when the rate of positive flow exceeds that produced by momentary changes in the supply pressure. This is accomplished by establishing a definite ratio between the superficial areas of the vane 45 and the valve disk 54. In other words, by increasing the superficial area of the vane for a given area of the valve disk or vice versa the rate of flow necessary to move the valve disk away from its seat may be predetermined within wide limits. The loose mounting of the vane 45 and the valve body 53 on the pivot 49 also permits the vane 45 to swing to the right independently of the valve disk 54 whenever, through surging or other causes, there is a negative flow in the pipe line in the direction opposed to the arrows applied in Figs. 1 and 2.

The vane 45 is made of relatively thin and flexible material which is bendable to conform to the curved contour of one of the pipe sections 7 when the vane is pressed against the upper portion of the pipe section by the pressure of the flowing water. Wedging of the vane 45 in the upper portion of the pipe section is prevented by the provision of ball members 63 attached to opposite side edges of the vane as shown to advantage in Figs. 2 and 3.

In Fig. 12 we have shown a slight modification in which the ring 5 is dispensed with. In this case the lugs 50 which carry the pivot 49 are attached to the bottom of the casing 9 and project downwardly through a slot 7a formed in the pipe line 7b. The valve seat 19a instead of being mounted as previously described is carried at the lower end of a pipe 64 provided with a bore or jet passage 65. Pipe 64 may be conveniently formed as a downward extension of the standpipe 18 appearing in Fig. 2. The fastening means for the assembly appearing in Fig. 12 comprises an upper strap 66 carried by the casing 9 and embracing the upper portion of the pipe line 7b and a lower strap 67 embracing the lower portion of the pipe line and secured to the upper strap by means of the bolts 68. The assembly of Fig. 12 is adapted to be used in special cases where the method of application shown in the preceding figures cannot be conveniently resorted to.

In the foregoing we have described what we now consider to be the preferred embodiments of our invention, but it will be understood that various desired changes may be resorted to within the scope and spirit of the appended claims. For example, the lever 21 instead of being equipped with a mercury switch as described herein may be arranged to function as a trip member for tripping a spring or weight operated mechanical transmitter for the purpose of automatically transmitting code signals over an electrical circuit.

Having thus described our invention, what we claim is:—

1. A flow operated valve mechanism for controlling communication between a fluid conduit and a jet passage having one end open to the bore of the conduit, said mechanism comprising a pivotally mounted valve arranged in the conduit to have the capacity of swinging movement to and from a position closing the conduit end of the jet passage, and a vane in the conduit mounted to swing about the pivotal axis of the valve, said valve and vane having engaging portions serving to swing the valve to open position when the vane is swung in one direction by the flow of fluid through the conduit, and said vane being free to move independently of the valve when swung in the opposite direction from its normal position.

2. An alarm mechanism for sprinkler systems as claimed in claim 1, including a valve closing spring connected between the valve and the vane adapted to hold the valve in a closed position over the conduit end of the jet passage when the vane is perpendicular to the axis of the conduit.

3. A flow operated valve mechanism for controlling communication between a fluid conduit and a jet passage having one end open to the bore of the conduit, said mechanism comprising a pivotally mounted valve positioned within the conduit and normally closing the conduit end of the jet passage, a vane mounted in the conduit to swing about the pivotal axis of the valve, said vane being normally perpendicular to the longitudinal axis of the conduit, said valve and vane having engaging portions adapted to swing the valve to open position when the vane is swung in one direction from its normal position by the flow of fluid through the conduit and said vane being free to move independently of the valve when swung in the opposite direction from its normal position.

4. The combination with a fluid conduit of a jet passage having one end open to the bore of said conduit, a fixed pivot shaft arranged in said conduit, a valve for closing the conduit end of the jet passage including a valve body loosely mounted on the pivot, a vane having portions loosely mounted on the pivot shaft at opposite sides of the valve body, said vane having a part engaging an extension of the valve body whereby the valve body and valve are swung to a position uncovering said passage when the vane is swung in one direction by the flow of fluid through the conduit, said vane being free to move independently of the valve when swung in the opposite direction from its normal position and a spring connected between the valve body and the vane and normally tending to hold the engaging parts of the valve body and vane in contact with each other, said spring being connected to the valve body at a point located between the extension engaged by the vane and the pivotal axis of said body.

5. In combination with a conduit and a radial jet passage having its inner end communicating with the bore of said conduit, a fixed pivot shaft arranged within said conduit, a valve loosely mounted on the shaft for swinging movement to and from a position closing the conduit end of the jet passage, a vane provided with hanger portions loosely mounted on said shaft at opposite sides of the valve, said vane and valve being engaged with each other so that the valve is opened when the vane is swung in one direction by the flow of fluid in the conduit, said vane being free to swing in the opposite direction independently of said valve and a spring connection between the vane and valve whereby the valve is held in its closed position when the vane is perpendicular to the bore of the conduit.

6. The combination with a conduit and a jet passage having one end open to the bore of said conduit of a valve mechanism for controlling communication between said bore and said conduit, said mechanism comprising a fixed pivot shaft arranged in the conduit, a valve body rotatably mounted on said shaft, a valve member carried by the valve body on one side of said shaft and normally positioned to close the conduit end of the jet passage, a lateral extension projecting from the opposite side of said valve body, a vane having portions thereof loosely mounted on said shaft at opposite sides of the valve body and having a part engaging said extension whereby the valve body is rotated to open the valve when the vane is swung in one direction by the flow of fluid through the conduit, said vane being free to swing in the opposite direction independently of the valve body and a resilient connection between the vane and valve body normally serving to hold the extension of the valve body in contact with said vane.

WILLIAM R. HAMILTON.
ROBERT W. HAMILTON.